METERING ARRANGEMENTS FOR AUTOMATIC TELEPHONE SYSTEMS

Filed March 10, 1958 9 Sheets-Sheet 1

INVENTORS
JOHN FRANK GREENAWAY
PETER SAMUEL HAMPSON
DONALD HALTON
KENNETH GEORGE MARWING

METERING ARRANGEMENTS FOR AUTOMATIC TELEPHONE SYSTEMS

Filed March 10, 1958

INVENTORS
JOHN FRANK GREENAWAY
PETER SAMUEL HAMPSON
DONALD HALTON
KENNETH GEORGE MARWING
BY [signature] ATTY.

INVENTORS:
JOHN FRANK GREENAWAY
PETER SAMUEL HAMPSON.
DONALD HALTON
KENNETH GEORGE MARWING.
BY Irwin S. Thompson ATTY.

INVENTORS
JOHN FRANK GREENAWAY
PETER SAMUEL HAMPSON
DONALD HALTON
KENNETH GEORGE MARWING
BY Irwin S. Thompson ATTY.

METERING ARRANGEMENTS FOR AUTOMATIC TELEPHONE SYSTEMS

Filed March 10, 1958 9 Sheets-Sheet 5

INVENTOR:
JOHN FRANK GREENAWAY
PETER SAMUEL HAMPSON
DONALD HALTON
KENNETH GEORGE MARWING

BY Irwin S. Thompson ATTY.

INVENTORS
JOHN FRANK GREENAWAY
PETER SAMUEL HAMPSON
DONALD HALTON
KENNETH GEORGE MARWING
BY Irvin A. Thompson ATTY.

METERING ARRANGEMENTS FOR AUTOMATIC TELEPHONE SYSTEMS

Filed March 10, 1958 9 Sheets-Sheet 7

JOHN FRANK GREENAWAY,
PETER SAMUEL HAMPSON,
DONALD HALTON,
KENNETH GEORGE MARWING.
INVENTORS
BY
Irwin S. Thompson
ATTORNEY INVENTORS
JOHN FRANK GREENAWAY
PETER SAMUEL HAMPSON
DONALD HALTON.
KENNETH GEORGE MARWING.
BY
Irwin S. Thompson
ATTORNEY

METERING ARRANGEMENTS FOR AUTOMATIC TELEPHONE SYSTEMS

Filed March 10, 1958 9 Sheets-Sheet 9

INVENTORS
JOHN FRANK GREENAWAY
PETER SAMUEL HAMPSON
DONALD HALTON
KENNETH GEORGE MARWING.
BY
Irwin S. Thompson
ATTORNEY United States Patent Office 3,067,290

Patented Dec. 4, 1962

3,067,290

METERING ARRANGEMENTS FOR AUTOMATIC TELEPHONE SYSTEMS

John Frank Greenaway, Taplow, and Peter Samuel Hampson, Donald Halton and Kenneth George Marwing, Liverpool, England, assignors to Automatic Telephone & Electric Company Limited, Liverpool, England, a British company Filed Mar. 10, 1958, Ser. No. 720,471
Claims priority, application Great Britain Mar. 12, 1957
8 Claims. (Cl. 179—7)

Figure 1:
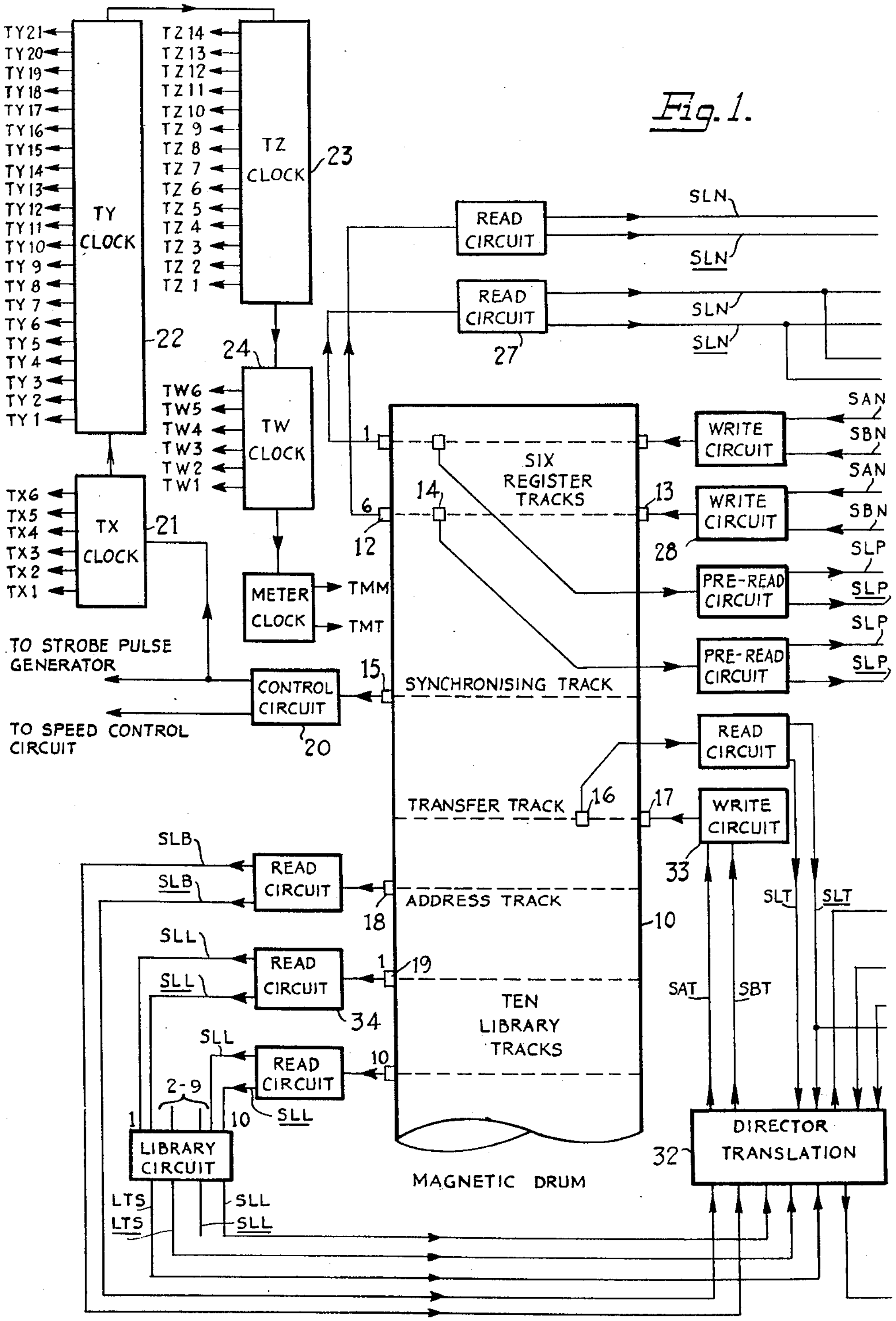

The present invention relates to metering telephone calls, and is particularly concerned with arrangements in trunk exchanges for generating repetitive metering impulses in respect of a connection, at a rate dependent upon the geographical length of the connection.

It has previously been proposed to employ a magnetic drum which provides an individual register for each call from an exchange, held throughout the duration of the call, information stored in the register being used to determine the rate at which impulses are returned to the calling subscriber's meter. Existing arrangements of this type for instance as shown in U.S. Patent No. 2,849,535, have been dependent upon a supply of impulses generated by an independent pulse source, but the use of a common pulse source has several disadvantages. One disadvantage is that the provision of a large number of different metering rates tends to require a large amount of equipment; another is that the requirement is subject to errors in the length of the pulse interval immediately following the establishment of the connection.

It is the object of the invention to provide an improved metering arrangement and also to provide a method of generating meter impulses in a system of the above type employing a magnetic drum, in which the disadvantages associated with the use of a common impulse source are avoided.

According to the invention a telephone system including a plurality of registers provided by a high-speed storage device of the magnetic drum type and employed for controlling the metering of connections against calling subscribers by means of single impulses repeated at intervals which are different for different connections and means which cause a number to be recorded in a register concerned with a connection, the number being determined by the interval required between the metering impulses appropriate to said connection, said means also serving to change the value of the number by a predetermined amount at fixed intervals until the number attains a predetermined value when a metering pulse is caused to be transmitted, the recording of the number and the changing of its value being repeated continuously during the existence of the connection.

According to one aspect of the invention, in a telephone system having a plurality of registers which are provided by a high-speed storage device of the magnetic drum type and which are employed for recording indications of the charge rates for connections and for controlling the transmission of pulses for effecting the metering of the connections against calling subscribers, the registers being scanned successively arrangements are provided which, subsequent to the recording in a register of an indication of the charge rate for a connection, record in the same register a number determined by the indication of the charge rate and which changes the value of said number each time the register is scanned until the number attains a predetermined value when a metering pulse is caused to be transmitted, the recording of said number and the changing of its value being repeated continuously during the existence of the connection.

According to another aspect of the invention, in a telephone system having a plurality of registers which are provided by a high-speed storage device of the magnetic drum type and which are employed for recording numbers representative of the charge rates for connections and for controlling the transmission of pulses for effecting the metering of the connections against calling subscribers, the registers being scanned successively arrangements are provided which, subsequent to the recording in a register of said number, serve to translate said number into a second number and to record said second number in the same register and which change the value of said second number each time said register is scanned until the second number attains a predetermined value when a metering pulse is caused to be transmitted and the first number is again translated into the second number which is again recorded, the translation of the first into the second number, the recording of the second number and the changing of its value being repeated continuously during the existence of the connection.

According to a further aspect of the invention, in a telephone system employing at least one translator for translating dialled digits into routing digits and a meter code digit, a plurality of meter registers provided by a high-speed storage device of the magnetic drum type are included to which the meter code digits are transferred, a meter register serving to control the transmission of a single metering pulse at intervals determined in accordance with the meter code digit registered therein.

The invention will be described in two embodiments, given by way of example, which are illustrated in the accompanying drawings comprising FIGS. 1–11.

Figure 2:
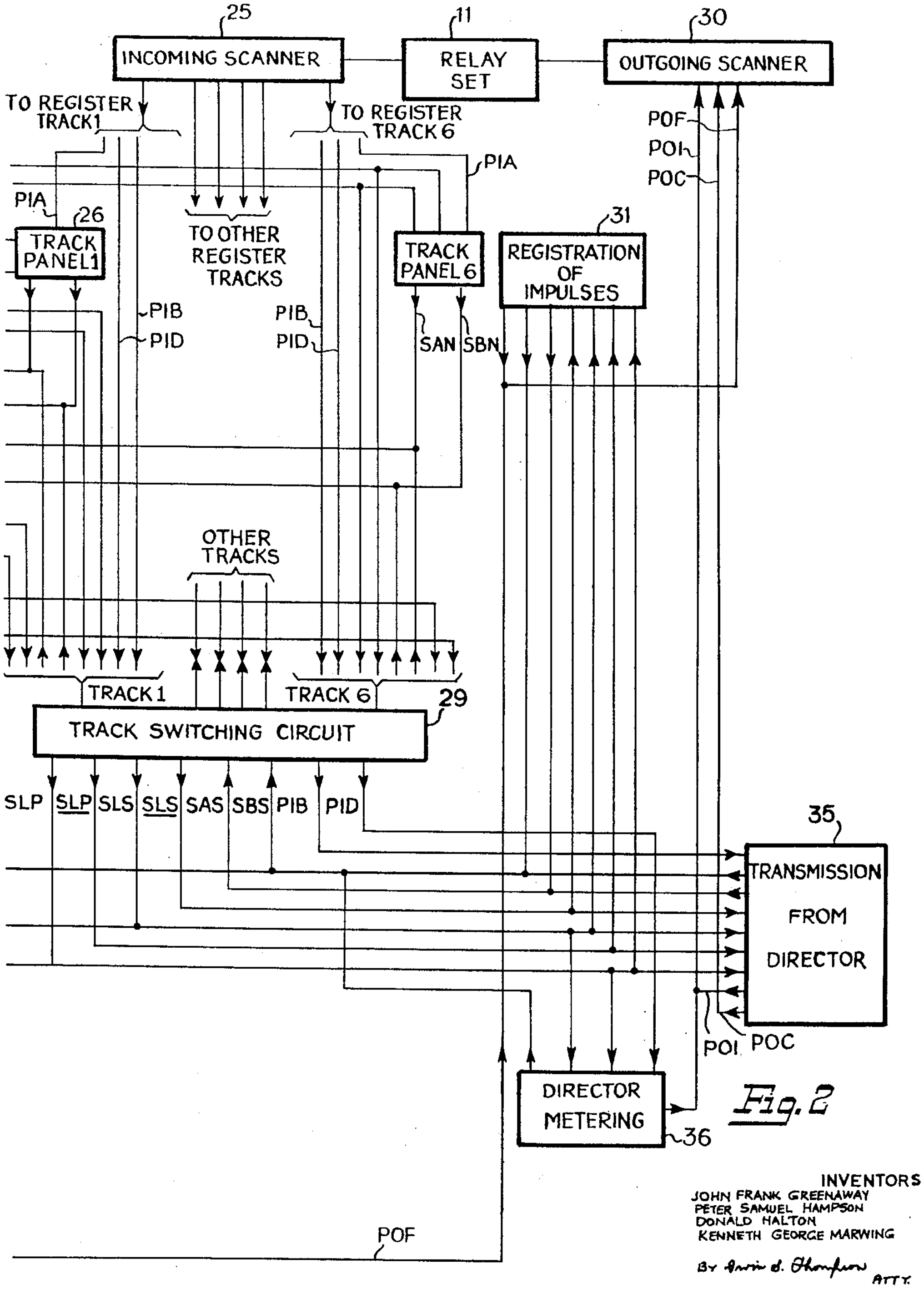
Figure 3:
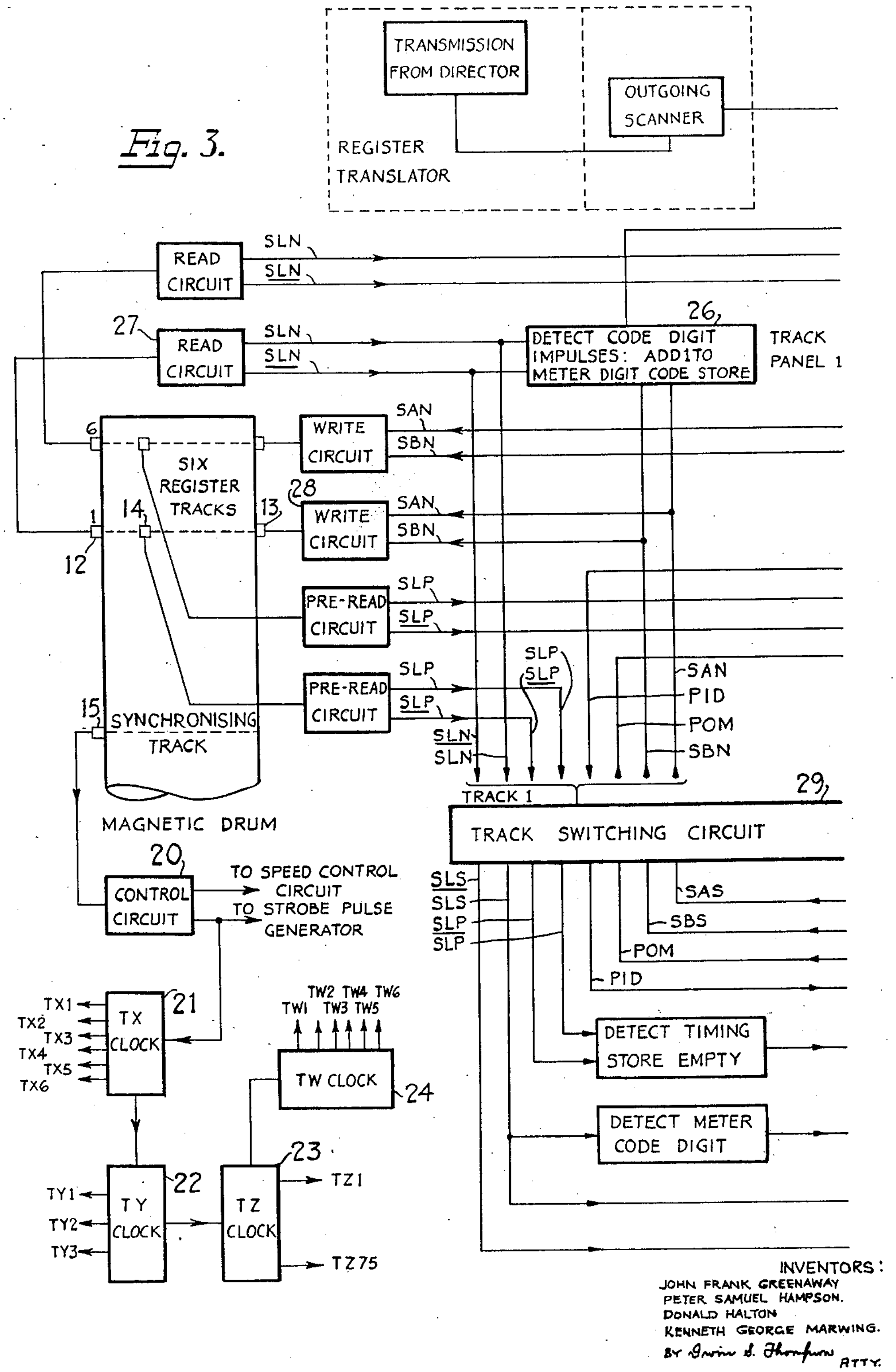
Figure 4:
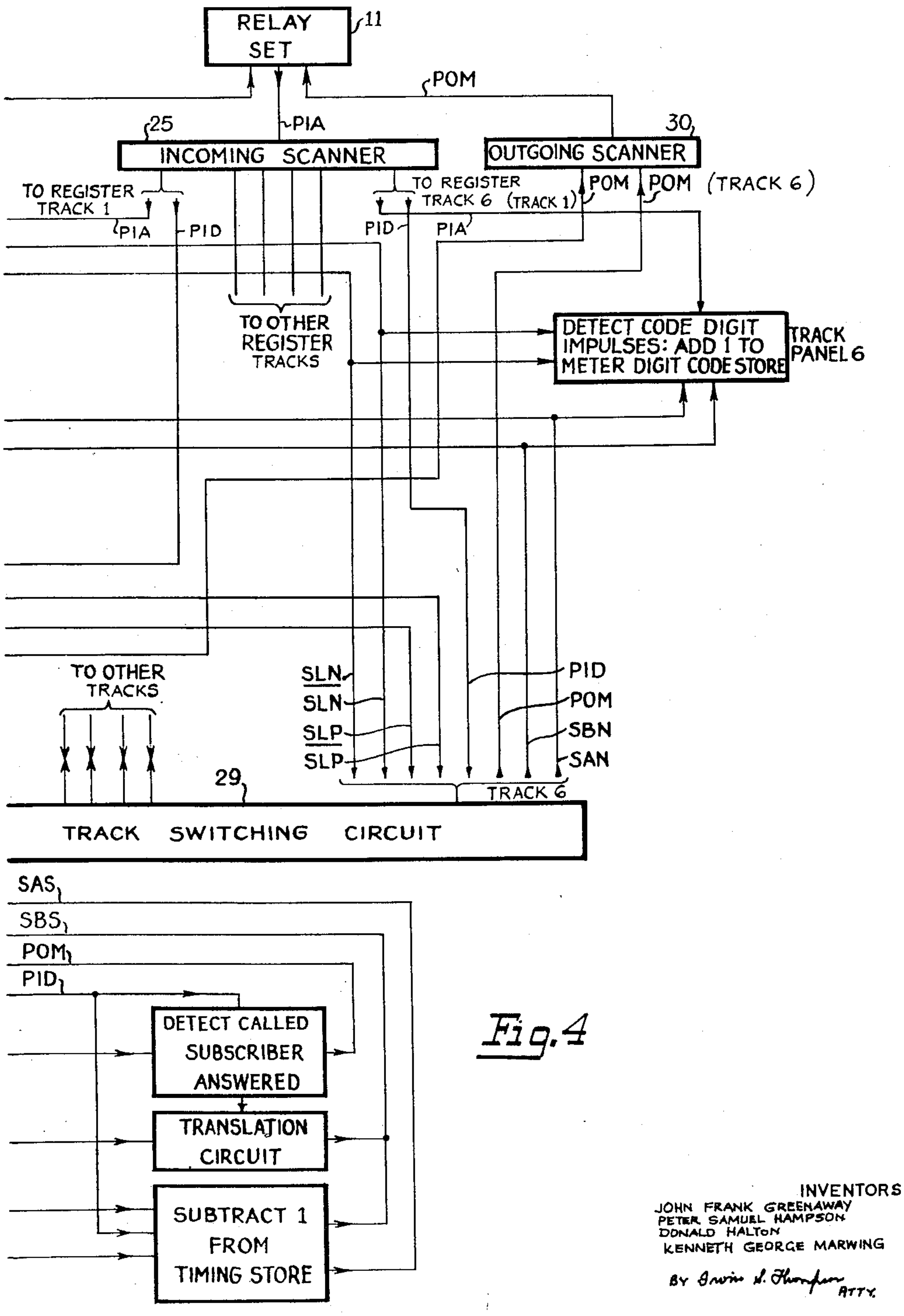
Figure 5A:
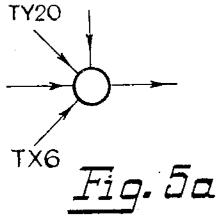
Figure 5B:
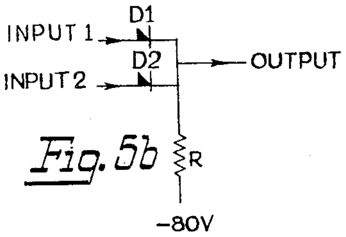
Figures 6A, 6B:
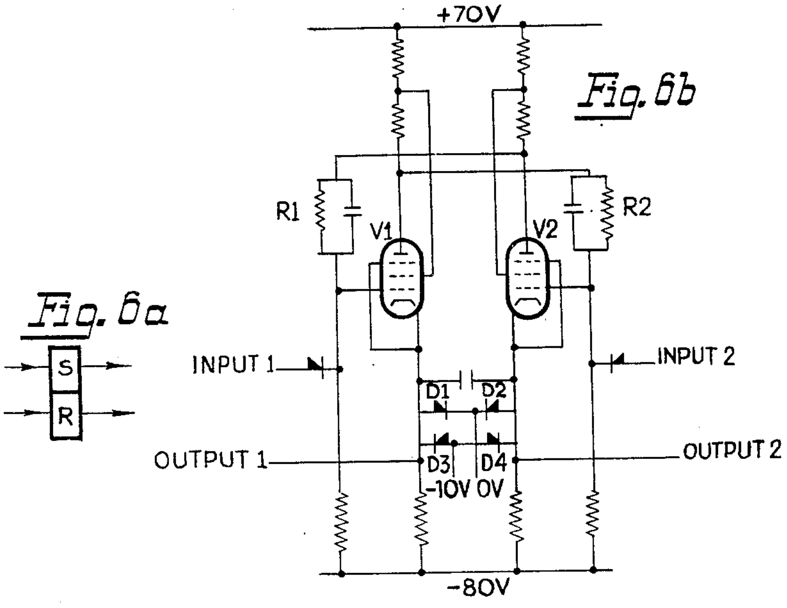
Figure 7:
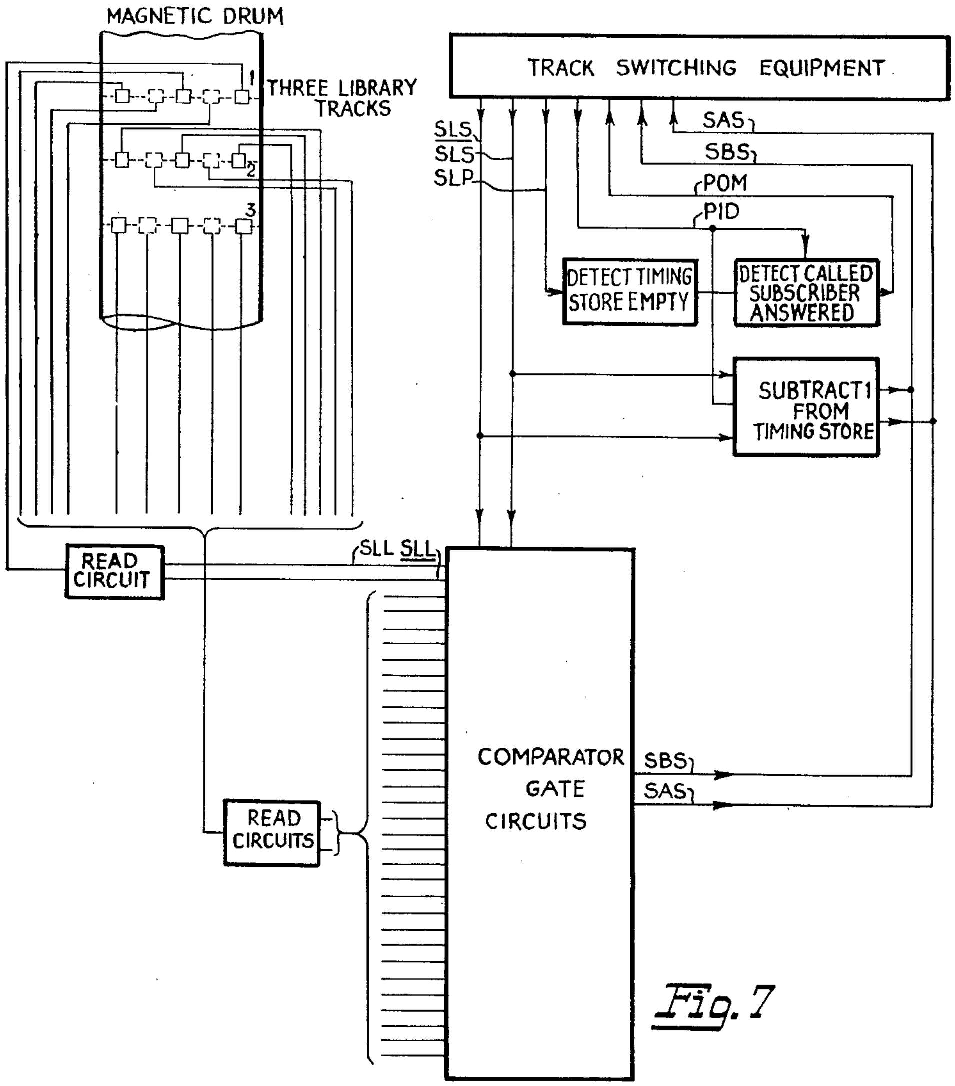
Figure 10:
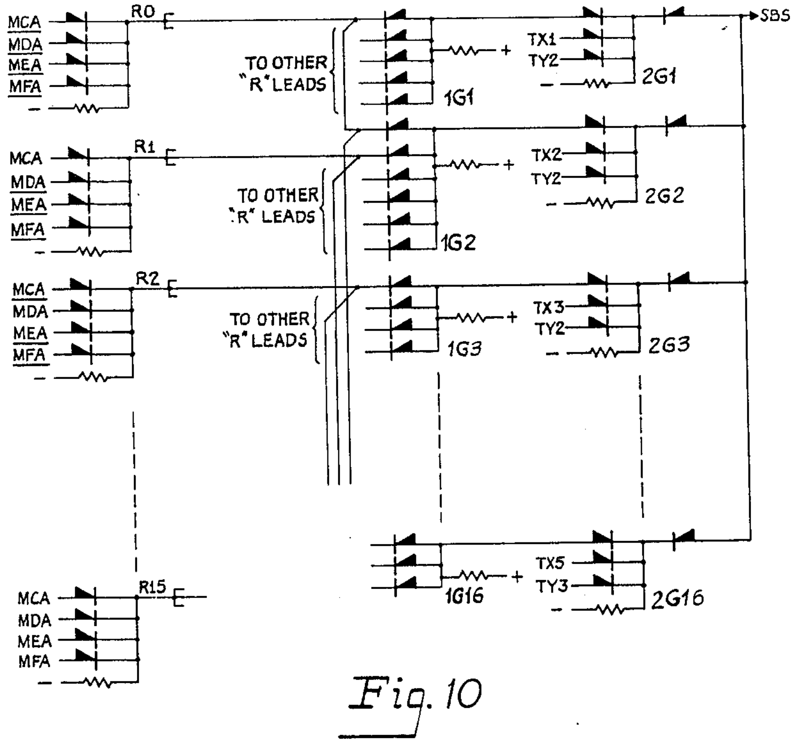
Figure 8:
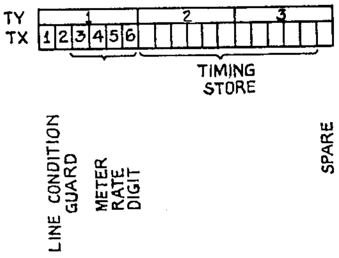
Figure 9:
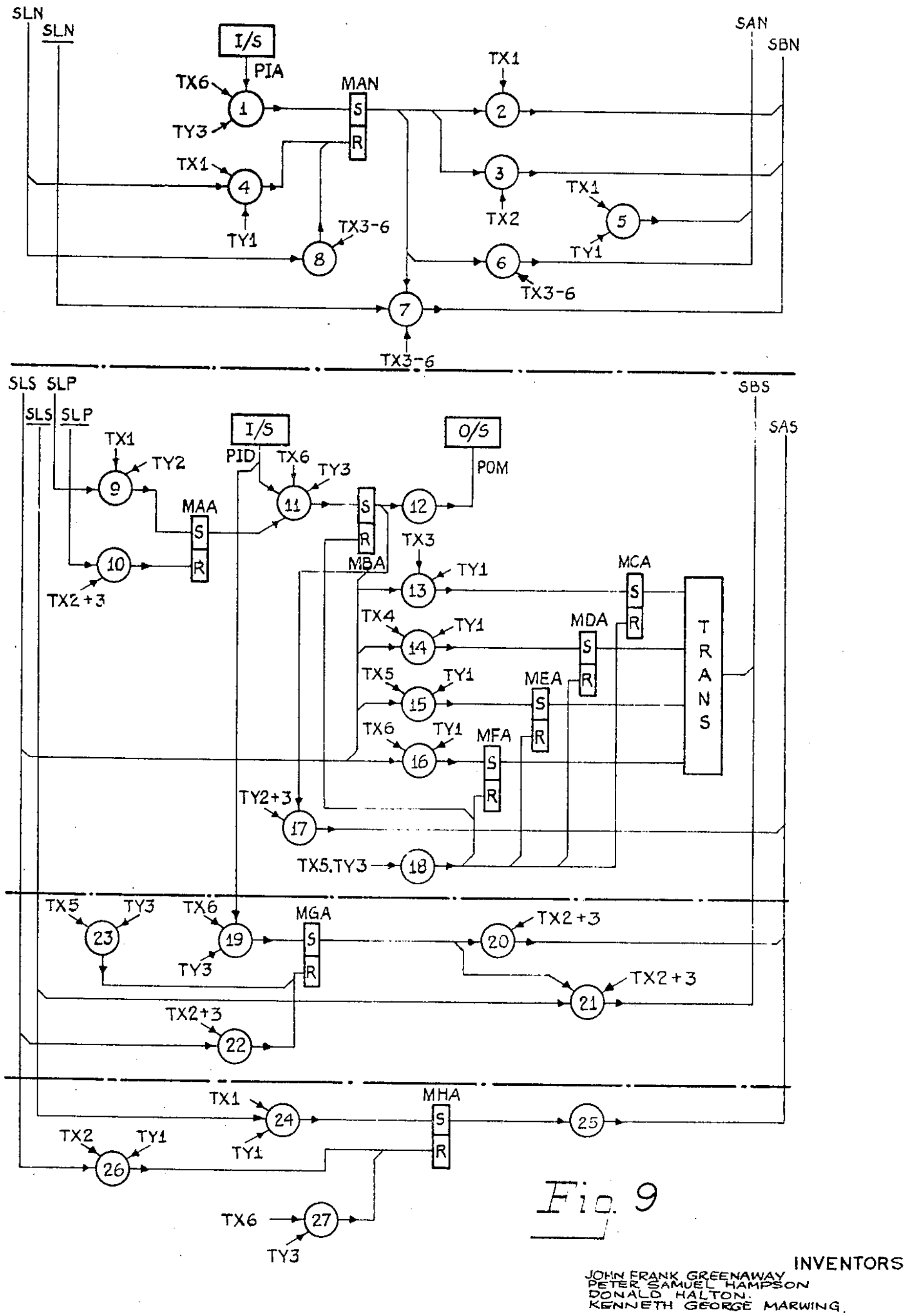
Figure 11:
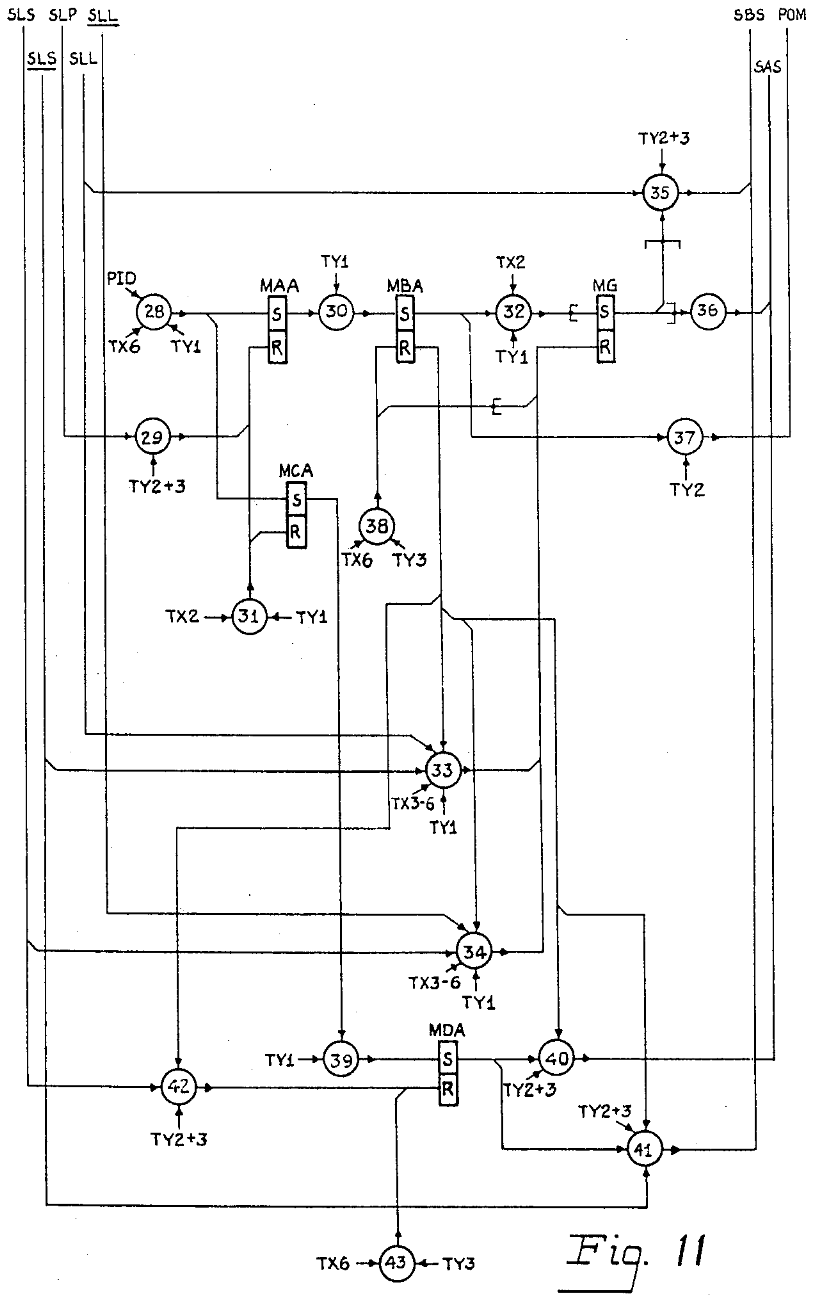

Of the drawings:

FIGS. 1 and 2 form a block diagram of a register translator employing a magnetic drum, FIGS. 3 and 4 form a block diagram of one embodiment of the invention, FIGS. 5*a* and 5*b* show respectively the symbol employed to represent a coincidence circuit and the detailed arrangement thereof, FIGS. 6*a* and 6*b* show respectively the symbol employed to represent a relay and the detailed arrangement thereof, FIG. 7 is a block diagram of a second embodiment of the invention, FIG. 8 shows the arrangements of storage elements in a meter register, FIG. 9 is a circuit of the first embodiment, FIG. 10 is an abbreviated circuit of the translator employed in the first embodiment, and FIG. 11 is a circuit of the second embodiment.

Register translators employing magnetic drums are known, in particular from continuation-in-part application Serial No. 635,708 to G. T. Baker and from copending application Serial No. 664,820 to K. G. Marwing et al. FIGS. 1 and 2 accompanying this application have been extracted from FIGS. 13 and 14 appearing in application Serial No. 664,820 and are shown here in order to clarify the differences between the register translators of the prior application and the meter registers of the present application. Accordingly a general description will first be given of the register translator shown in the accompanying FIGS. 1 and 2.

As is well known, the purpose of a register translator is to accept digits, for instance, three exchange code and four numerical digits, dialled by a calling subscriber for the purpose of setting up a connection to a called party, to store the digits, to translate the exchange code digits into a series of routing digits and any other digits, for example, meter code digits, which may be necessary for controlling the connection and finally to transmit the translated digits, the numerical digits and possibly the other digits. Register translators employing conventional automatic switches and electromagnetic relays for storage and control purposes have been well known for many years but the register translator shown in FIGS. 1 and 2 employs a magnetic drum 10 having a large number of registers each of which is associated with an individual external relay set, such as relay set 11, the drum including a common translator for all the registers.

Each of the registers consists of a section of track on the surface of the drum and there are a total of six register tracks. Associated with each register track is a read head, such as 12, a write head, such as 13 and a pre-read head, such as 14. Other tracks on the drum consist of a synchronising track, a transfer track, address track and ten tracks on which are stored permanent information, the latter tracks bbeing referred to as library tracks. A read head 15 is associated with the synchronising track, a read head and a write head 16 and 17 respectively are associated with the transfer track, a read head 18 is associated with the address track and associated with each library track is a read head, such as 19.

Each register track is divided into sections, each of which forms a register and each section consists of a group of storage blocks for the storage of numerical digits in binary form and also of binary digits for control purposes. In the embodiment shown in FIGS. 1 and 2, there are 14 sections in each register track, each section of a register track contains 21 storage blocks and each storage block contains 6 elemental storage areas. Access to particular storage areas is obtained by means of a system of square-wave clock pulses provided by a pulse generator driven from the synchronising track on the drum. The synchronising track carries a sine waveform and the output from the read head 15 is applied to a control circuit 20. This control circuit provides two square wave outputs having the same repetition frequency, a pulse of one output occupying the time between two adjacent pulses of the other output. One of the outputs is applied to a strobe pulse generator for a purpose to be described later while the other is applied first to a further control circuit for maintaining constant the speed of rotation of the drum and second to the clock pulse generator. The clock pulse generator consists of the TX clock 21, the TY clock 22, the TZ clock 23 and the TW clock 24. The TX clock 21 is driven directly from the output of the control circuit 20 and comprises a 6-state counter having six pulse leads TX1, TX2, TX3, TX4, TX5 and TX6. The TY clock 22 is a 21-state counter and is driven from the last stage of the TX clock. Similarly the TZ clock is a 14-state counter which is driven from the last stage of the TY clock whereas the TW clock is a 6-state counter driven from the last stage of the TZ clock. The sine waveform on the synchronising track is so related to the revolution period of the drum that each TW pulse has a duration equal to the time taken for the drum to make one electrical revolution. This differs from a mechanical revolution in a manner to be described later.

All the pulses in a series are contiguous, and the commencement of a pulse of any series coincides with the commencement of a pulse in the series of next higher frequency.

The duration of a single TX pulse is used to define the length of track to be occupied by a single storage element containing one binary digit, this length of track passing completely under a read or write head during one TX pulse. TY pulses are used to define the length of track occupied by a block of six elemental areas and when such a block is used as a digit store, a digit representing nought to ten in binary form, together with two controlling binary digits, may be stored therein. Other uses are made of certain of these blocks in controlling and manipulating digital information. TZ pulses define the length of track occupied by a register which contains 21 storage blocks TY, and TW pulses are used to define the length of track occupied by all the registers on a single track, which is, in fact, half the length of the track.

The pulses in each series are distributed over a set of leads in a recurring cycle, there being six TW leads, 14 TZ leads, 21 TY leads and six TX leads. By combining a lead from each of these series in an "and" type of coincidence circuit, it is possible to obtain a single output pulse of duration equal to a TX pulse, at any required point in the complete cycle of TW pulses. Since the pulse cycle is synchronised with the rotation of the drum and commences as a particular slot on the drum passes under a reading head, such coincidence circuits may be used to define the passage of a particular elemental area or slot under a reading or writing head. It is therefore convenient to designate each storage position on a track by the timing pulse occurring as that particular position is scanned, e.g.

TX2.TY21.TZ14

It is sometimes necessary for a timing pulse to continue for more than one TX period, and combined timing leads may conveniently be used to reduce the number of coincidence circuits required. Where a timing lead has an output covering more than one timing period, a "+" sign is used, e.g.

(TX5+6)

The coincidence circuits are represented in the drawings by symbols of which that shown in FIG. 5*a* is typical. The timing pulse leads TX6 and TY20 comprise two of the inputs to the circuit, and the other two inputs may be, for example, connected to the output circuits of two relays or of reading heads. The arrows indicate the direction of the signal between circuit elements. The circuit arrangement of a coincidence circuit with two inputs is shown in FIG. 5*b*, from which it will be seen that it consists of two diodes D1 and D2 and a resistor R. In the absence of a pulse on either input lead, the potential at the left-hand side of each diode is zero volts and both diodes will conduct. The potential at the output lead is thus zero volts. If now a pulse having a value of −10 volts is applied to input 1 diode D1 will be backed off due to the fact that diode D2 is still conducting. The potential at the output lead is therefore still zero volts. If, however, a pulse is present on both input leads both diodes will conduct and the potential on the output lead will be −10 volts. Therefore, an output pulse is obtained only when there is an input pulse on input 1 and input 2. The arrows in FIG. 5*b* have the same significance as those in FIG. 5*a* and it will be understood that additional inputs may be catered for merely by the addition of the appropriate number of input leads each with its diode.

Pulses from these coincidence circuits may be used to operate electronic relays, which are of the bistable type and in the set condition give an operative output on one output lead, and in the re-set condition give an operative output on a second output lead. The relays may also be operated by other similar relays.

The symbol for a relay used in the drawings is shown by the example in FIG. 6*a*. The "set" and "re-set" halves of the relay are referenced "S" and "R" respectively. In each case, it is assumed that the input signals to a relay come from the left-hand side, while the output signals are taken from the right-hand side of the relay.

The circuit of a relay or toggle circuit is shown in FIG. 6*b*. Basically, the circuit consists of a bistable arrangement of two tubes V1, V2 of the type which has been known for many years as the Eccles-Jordan circuit. The bistable property of the circuit is provided by the cross-coupling resistors R1 and R2 between the grids and anodes of the two tubes. Since the potential on an output lead is, for this particular embodiment, required to vary from 0 to −10 volts, diodes D1 to D4 are included to hold the potential to the required values.

The outputs of relays and of coincidence circuits are also used to record information on the tracks of the drum, and for this purpose so-called "A" and "B" leads are employed. A "write" signal applied to an "A" lead results in a magnetic marking representing "0" being written or re-written on a track, and a "write" signal applied to a B lead results in a magnetic marking representing "1" being written or rewritten on the track. If "write" signals are applied to both leads simultaneously, the effect of the B lead predominates, and a 1 is written on the track.

In order to make the writing and switching operations definite, very short strobe pulses previously referred to are employed, which occur at a point towards the end of each TX pulse. The strobe pulses are ineffective on their own, but when they coincide with a relay-operating pulse or a writing pulse, the two pulses together effect the circuit operation. It was mentioned that a relay has two output conditions, dependent on the set or re-set condition of the relay. These may be indicated when describing circuit operations in symbolic form by using the relay designations alone to refer to the set condition, e.g. MAB, and by using the relay designation underlined to refer to the re-set condition, e.g. $\underline{\text{MAB}}$. Thus a circuit operation in which a relay MBK is re-set when the last storage element of a register has passed the read head may be written:

TX6.TY21—$\underline{\text{MBK}}$ showing that in the time period represented by TX6, TY21, a signal is applied to relay MBK to re-set it, whether it was previously set or not. If this relay is to be set during another part of the register scan, but only if a second relay MAK is already in the set condition, the circuit operation may be written:

MAK.TX6.TY19—MBK

This circuit, of course, would be inoperative if relay MAK were in the reset condition, and at any other instant than during the passage of element TX6.TX19 under the read head. It should be noted that this operation is not dependent upon the signal stored in element TX6.TY19 of the register.

It was mentioned earlier that each register has a relay set permanently allotted to it and the relay sets are associated in turn with the appropriate registers on the drum by an incoming scanner 25, in such a manner that a register is associated with its relay set for the transfer of information once in each electrical revolution of the drum. The speed of rotation of the drum is 1800 revolutions per minute and a revolution therefore takes 33⅓ ms. It is convenient to use only half the circumference of the drum for a register track, the reading and writing heads being 180° apart. This effectively superimposes the reading and writing heads on these tracks. It will thus be seen that a register is examined by its reading head twice in each mechanical revolution of the drum, i.e. at intervals of 16⅔ ms. and the electrical speed is therefore twice the mechanical speed as far as the scanning operation is concerned. Since a relay set is sampled each 16⅔ ms. any change of condition in the relay set due to dialling will be recorded by the register if the dialling speed does not greatly exceed the normal 10 impulses per second.

The incoming scanner 25, which serves to associate the relay sets in turn with the appropriate registers, consists of a number of coincidence circuits. A lead from each relay set forms one input to a coincidence circuit individual to the relay set, the other input being the pulse lead from the TZ clock which identifies the register appropriate to the relay set. Since there are 6 register tracks, the outputs of the individual coincidence circuits are commoned in six groups and each common output forms one input to a further coincidence circuit, the second input to which consists of the appropriate TW pulse. The outputs from the six further coincidence circuits are taken to the six track panels, such as track panel 26 which is connected to the read circuit, such as 27, and the write circuit, such as 28, of the register track concerned.

Certain of the equipment (translation circuit, metering circuit and transmission circuit) is provided in common to all register tracks and the track switching circuit 29 is provided for associating the register tracks in turn with the common equipment. As there are six register tracks, it will be seen that each track will be scanned by the common equipment once every 100 ms.

As regards the outgoing signals to the relay set, these are provided on a single lead from the common equipment and are distributed to the relay sets by the outgoing scanner 30. This circuit is controlled by TW and TZ pulses and is the reverse of the incoming scanner.

The operation of the registering and translating device takes place briefly as follows. When a calling subscriber lifts his receiver to initiate a call, his line circuit is extended to a relay set such as the relay set 11. The incoming scanner 25 operates continuously to associate the relay sets successively with the appropriate register tracks on the drum. Each register track is provided with a track panel such as 26, the track panels being connected to the common equipment in turn by the track switching circuit 29 which is itself controlled by the TW pulses. When the calling subscriber commences dialling, the impulses for each digit in turn are written by the appropriate track panel and write circuit into a temporary storage position in the register corresponding to the calling relay set. The temporarily stored impulses are detected by the pre-read head, such as 14, of the appropriate register track and are transferred to the appropriate one of the storage blocks by the registering circuit 31. This circuit also detects the inter-digital pause and ensures that the impulses forming the next received digit are transferred to the next storage block. The purpose of the pre-read head, which is positioned a distance equal to one register section in advance of the normal read head, is to enable information stored in the register to be examined before the register comes under the write head. It thus enables information to be transferred within the register to a position which is scanned earlier, without the necessity for externally storing such information for a whole revolution of the drum. This type of forward transfer is used during registration of dialled digits.

It will be assumed that the first three digits registered on the register track are the three exchange code digits of the required exchange. The first of these digits is read by the reading head of the register track in question and is passed through the track panel, such as 26, and the track switching circuit 29 to the translation circuit 32 where it selects one of the 10 library tracks. The second and third digits are passed over the same path to the translation circuit and thence to the write circuit 33 where they are written on to the transfer track. The transfer track reading and writing heads are spaced apart by a distance of seven TY blocks and the circuits of the reading and writing heads are so arranged that the information read by the read head of one section of the transfer track is immediately written in by the write head to the next succeeding section of the track so that the digits registered on the transfer track are circulated around the track and in each position of the digits on the transfer track they are compared with the permanent registrations on the address track until coincidence is attained. This serves to select one section of the selected library track and the translated digits on this section are now read from the library track and passed through the library read circuit 34, the translation circuit 32, track switching circuit 29, track panel 26 to the writing head of the appropriate register track, and are registered as routing digits on the register track. The numerical digits are also registered on the register track.

The routing digits are written into the register during one scan of the drum and impulse transmission begins on the next scan by the read head of the appdopriate register. This is effected by subtracting one from the digit each time the register track is scanned by the common equipment and at the same time causing a signal to be transmitted over the track panel 26, track switching circuit 29, transmitting circuit 35, outgoing scanner 30 to the relay set 11. The relay set 11 repeats the signal as an impulse of the correct length and shape to the selector switches over which the connection is set up. Since each register track is scanned every 100 ms., it will be understood that impulse transmission from the relay set 11 takes place at the rate of 10 i.p.s. When the number stored in a storage block is reduced to zero, an interdigital pause timing period is started and, at the end of this period, the digit in the next occupied storage block is transmitted in a similar manner. In this way, the various routing digits and the numerical digits are transmitted in succession to set up the call to the called subscriber.

The library in addition to returning routing digits also returns a meter code digit to the register to enable the call to be metered on a multi-fee basis. Metering is effected by providing a series of meter clock pulses from the meter clock 36 and selecting the appropriate ones of the meter clock pulses as determined by the meter code digit. The selection of the metering pulses is effected in the metering circuit 36. When the called subscriber answers, a signal is sent from the relay set 11 through the incoming scanner 25, track panel 26 to the register track writing head. When this signal is read by the pre-read head, an indication is passed to the metering circuit 36 to initiate the metering operation which takes place within the cycle time of the series of meter clock pulses and which consists in the transmission of one or more pulses to the calling subscriber's meter through the outgoing scanner 30 and the relay set 11.

Consideration will now be given to FIGS. 3 and 4 which show in block schematic form one embodiment of the metering register of the present invention. The equipment shown within the dotted rectangle and labelled "Transmission From Director" and "Outgoing Scanner" corresponds to the similarly labelled equipment shown in FIG. 2, while the relay set corresponds to the relay set 11 shown in FIG. 2. Items shown in FIGS. 3 and 4 which also appear in FIGS. 1 and 2 are given the same references as in FIGS. 1 and 2.

It will be understood that although the metering register shown in FIGS. 3 and 4 is associated with a register translator of the type shown in FIGS. 1 and 2, this is not essential and the metering register can be used in conjunction with any other type of register translator.

The magnetic drum is provided wtih six register tracks and a synchronising track but no transfer, address or library tracks are necessary since translation employing library tracks is not involved. Each of the register tracks is provided with read, write and pre-read heads such as 12, 13 and 14 respectively. The relay sets are successively associated with the appropriate registers by means of the incoming scanner 25 and track panel 26 in a similar manner to that described with reference to FIGS. 1 and 2. In addition each register track is scanned by the common equipment once every 100 ms., the track switching circuit 29 being employed for this purpose. Signals from the synchronising track are fed to the control circuit 20 which, as in the case of the register translator is effective on the speed control circuit, the strobe pulse generator and the clock system. The clock system consists of TX, TY, TZ and TW clocks 21, 22, 23 and 24 but it will be noted that the TY clock has 3 clock pulse leads only while the TZ clock has 75 clock pulse leads. This is because the number of storage blocks forming a register is 3 compared with 21 in the register translator shown in FIGS. 1 and 3. This means that with a drum of the same diameter many more registers can be accommodated on a register track than in the register translator and in fact the number is 75. The TW and TZ clock pulses control the incoming and outgoing scanners as in the register translator and similarly the TW clock pulses control the track switching circuit.

The track panels shown in FIGS. 3 and 4 differ from those used in the register translator and also the common equipment is different because the translating function is different and considerably simpler.

FIG. 7 shows these parts of the second embodiment of the present invention which differ from the first embodiment, and it should be explained that the arrangement of the incoming and outgoing scanners in relation to the relay sets, the track panels and the register tracks with their reading, writing and pre-read heads are the same in both embodiments. The two embodiments differ in the common equipment and in the fact that the second embodiment has three library tracks on the drum, each track having five equally spaced reading heads. The output from each reading head is taken through an individual read circuit to comparator gate circuits as will be explained in detail subsequently. The absence of a transfer track and an address track in this embodiment is due to the fact that a limited number of translations only are required and it can be arranged that these are available simultaneously as will be described later.

In the two embodiments to be described, the metering information provided by the common translator is again translated, in one case by a circuit associated with the drum, and in the other case by the drum itself, to provide a large number, which is stored in the meter register. This large number is repeatedly counted-down and subsequently re-written, the number being reduced by one on each scan of the register, and a meter impulse is generated each time the number is reduced to zero. The common impulse generator is therefore eliminated, each meter register providing its own meter impulses.

In the description, the following symbols are used to indicate the various signals written on to and read from the drum:

PIA—output signal from incoming scanning circuit individual to a register track.

PID—output signal from incoming scanner circuit common to all register tracks.

SLN, $\underline{\text{SLN}}$—1 and 0 signals read from a particular register track only, by individual track equipment.

SAN, SBN—0 and 1 signals written on to the particular register track by individual track equipment.

SLS, $\underline{\text{SLS}}$—1 and 0 signals read from register tracks by common equipment.

SAS, SBS—0 and 1 signals written on to register tracks by common equipment.

SLP, $\underline{\text{SLP}}$—1 and 0 signals read from register tracks by the pre-read head (common equipment).

SLL, $\underline{\text{SLL}}$—1 and 0 signals read from the library tracks.

POM—impulse transmitted to a subscriber's meter via the outgoing scanning circuit.

It should also be explained that the coincidence circuits shown in the drawings are numbered 1, 2, 3 and so on in the order in which they become effective, and these numbers are also shown in the description against the written form of the coincidence circuit.

The allocation of storage elements in a register may be seen by reference to FIG. 8. A register comprises three blocks of elements, designated TY1, TY2 and TY3, to correspond to the timing pulses during which the blocks are scanned, and each block comprises six storage elements TX1–6, these references also corresponding to the elemental timing pulses of the clock pulse system. In block TY1, element TX1 is used to record the open or closed loop condition of the connection to the incoming scanner from the trunk relay set, and element TX2 is used to store a guard marking while the calling subscriber is holding the trunk relay set. Elements TX3–6 are used to store a meter rate code digit in binary form. Blocks TY2 and TY3 together form a storage block for the meter pulse timing digit translated from this meter code digit. Not more than eleven elements would normally be required to store this timing digit, and in the present examples, element TX6.TY3 is left spare.

The meter code digit is provided by the translator together with the routing digits as described in U.S. Pat. No. 2,849,535, and when these are transmitted from the register in use via the trunk relay set in the form of trains of impulses, the meter code digit is directed to the incoming scanning circuit of the meter register, while the routing and numerical digits are transmitted to the route selector train in the usual way. The method used for transmitting trains of impulses from the drum is described in British Patent No. 717,688.

The meter register allotted to the call detects the train of impulses representing the meter digit as alternate closed and open loop conditions of the input circuit in a similar manner to that described in United States Patent No. 2,805,286. When the circuit is first closed, an output signal PIA is received from the incoming scanning circuit of the register track on which the allotted register is located, and this occurs during the scan of the register in advance of the register in question. This is due to a time displacement between the incoming scanning circuit and the track scanning equipment, whereby a signal PIA is detected slightly before the scan of the register to which the signal relates.

A general description will first be given with reference to FIGS. 3, 4 and 7 and this will be followed by a detailed description with reference to FIGS. 9, 10 and 11. The signal PIA is fed to the track panel 26 (FIG. 3) which consists of a single relay MAN which is set and reset once for each signal PIA. Each time relay MAN is set, one is added to the meter code digit stored in the meter register. This operation is common to both embodiments.

Referring now more particularly to the embodiment shown in FIGS. 3 and 4, signals read by the pre-read head 14 are transmitted to the block Detect Timing Store Empty in the common equipment, this block consisting of a relay MAA. This relay is set each time a meter register is scanned provided a meter code digit has been or is being registered therein and provided the timing store is empty. In the set condition of relay MAA a signal is passed to the block Detect Called Subscriber Answered. When the called subscriber answers, a signal PID is transmitted to the same block, the signal existing until the end of the connection. The signal PID in conjunction with the set condition of relay MAA enables a relay MBA in the block Detect Called Subscriber Answered, to be set thereby causing a metering pulse POM to be transmitted to the calling subscriber's line through the outgoing scanning circuit. The setting of relay MBA also initiates the operation of the Translation Circuit. The meter code digit is obtained from the read circuit and is applied to four code relays MCA, MDA, MEA and MFA in the block Detect Meter Code Digit. The four code relays are variably set for different meter code digits and the particular setting is fed to the Translation Circuit when relay MBA is set. The translated number is written in to the timing store of the meter register and relay MBA and the four code relays are reset when this operation is completed.

The signal PID is also applied to the block Subtract 1 From Timing Store and at the end of the scan of the meter register during which the translated number is written, a relay MGA in this block is set provided the signal PID still exists. The setting of relay MGA causes 1 to be subtracted from the translated number on the next scan of the register. Relay MGA is reset at the end of the scan of the timing store and is then reset if the signal PID still exists. When as a result of continued subtraction, the timing store becomes empty, relays MAA and MBA are again set and a second metering pulse is transmitted through the trunk relay set and the translation operation is again initiated in preparation for the transmission of a third metering pulse. This sequence of events continues as long as the connection is maintained, metering pulses being transmitted at intervals determined by the number written in to the timing store.

Referring now to FIG. 7, the number of possible translations is limited to the number of different metering rates available, 15 being the number in the present example. With such a small number of translation codes, it is possible to eliminate the use of a transfer track by arranging that all the the translation codes become available simultaneously.

It is convenient to use three library tracks, each being accessible from five reading heads evenly spaced round the drum. Each of the three library tracks is equally divided into five sections, and in each of these sections the 15 possible meter code digits are written, each followed by the corresponding translation code. The 15 meter code storage positions are arranged in the same order in corresponding sections of the library tracks, but the codes appear in a different order in each section of each track, in such a way that when a code is being scanned by one of the library track heads, a different code is being scanned by each of the other 14 heads. It is arranged that the code digits stored on the library track are read at the same instants as the code digits stored in a meter register, and the translation digits on the library tracks are read at the same instants as the corresponding elements of the timing blocks of the meter registers are being scanned.

The meter code digit is received and stored in the meter register in the same way as in the first embodiment. When the signal PID is received relays MAA and MCA in the block Detect Called Subscriber Answered are set and, provided the timing store is empty as indicated by a control from the block Detect Timing Store Empty, relay MBA is also set. With relay MBA set, the first metering pulse is transmitted and the translation operation begins and relays MAA and MCA are reset. Translation is effected by providing 15 library gating relays MG(1–15) which are controlled by two sets of comparison circuits, the gating relays and the comparison circuits forming the block Comparator Gate Circuits. The library gating relays MG(1–15) are set following the setting of relay MBA and the two sets of comparison circuits then compare the output signals from the register track reading head in use individually with those of all 15 library track reading heads, the corresponding library gating relays being reset when coincidence does not occur. It will thus be seen that at the end of the comparison operation, one library gating relay only remains set corresponding to the registered meter code digit. When one of the library gating circuits has been selected, the corresponding number is read from the library track and written in to the meter register. Relay MBA and the library gating relay are now reset.

Meter timing is effected in the same way as in the previous embodiment, a relay MDA in the block labelled "Subtract 1 From Timing Store" being set to subtract 1 from the number in the timing store each time the register is scanned.

A detailed description will now be given of the two embodiments and reference will first be made to FIG. 9. As previously described, the signal PIA is detected slightly before the scan of the register to which the signal relates.

During the scan of element TX6.TY3 of this previous register, a relay MAN is set by the circuit:

PIA.TX6.TY3—MAN (1)

The setting of relay MAN may now be effective in providing a marking in element TX1.TY1 of the alloted register, and the circuit for this is:

MAN.TX1—SBN (2)

In addition to the 1 marked in the line condition element TX1.TY1 a 1 is also marked in the guard element TX2.TY1 by the circuit:

MAN.TX2—SBN (3)

If, during the next scan of the track, the input circuit is still closed, relay MAN is re-set when the 1 marking in element TX1.TY1 is detected, by means of the circuit:

SLN.TX1.TY1—$\underline{\text{MAN}}$ (4)

but the guard marking remains in element TX2.TY1. If during this scan or in subsequent scans the input circuit is opened due to the commencement of an impulse, the PIA signal is removed, and a circuit:

TX1.TY1—SAN (5)

cancels the line condition marking in element TX1.TY1.

Each time relay MAN is set, one is added to the meter code digit stored in binary form in elements TX3–6 of block TY1, when the input circuit is closed following the open period forming the impulse to be added. Since an impulse is also registered when the register is first taken into use by the closing of the input circuit the number in the meter digit store is one more than the number of impulses received. This can be corrected in a manner to be described subsequently. The adding circuits conform to the well-known rule for adding one to a binary number, i.e. change all 0's to 1's and 1's to 0's, commencing with the lowest order, until a 0 has been changed to a 1. The circuits used are:

MAN.(TX3–6)—SAN (6)

MAN.$\underline{\text{SLN}}$.(TX3–6)—SBN (7)

and $\underline{\text{SLN}}$.(TX3–6)—$\underline{\text{MAN}}$ (8)

The first of these circuits (6) attempts to write a 0 in elements TX3–6, while the second (7) writes 1 in an element each time a 0 is detected in it. It will be recalled from the description of the previously-mentioned application that when an "A" signal and a "B" signal occur simultaneously, the "B" signal takes precedence and a 1 is written. When the second (7) of the three circuits has detected a 0 it is immediately re-set by the third circuit (8) which becomes effective upon the first detection of a 0 following the setting of relay MAN. At the end of the impulse train, the input circuit is closed, and relay MAN is re-set on each successive scan by means of circuit (4), so that there is no further addition to the meter code digit. The foregoing circuits are common to both examples. Considering now the first example, when the call has been set up, a signal PID is received by the common equipment via the common incoming scanning circuit when the called subscriber answers. As in the case of the track equipment, there is a time displacement between the incoming scanning circuit and the register scanning circuit, the signal PID appearing during the scan of the register immediately in advance of the one to which the signal relates. A relay MAA is set during the scan by the common equipment of each meter register by the circuit:

SLP.TX1.TY2—MAA (9)

if the pre-read head detects a 1 in element TX1.TY2. This relay remains set if all the elements in blocks TY2 and TY3 of the register being scanned by the pre-read head are marked with a 1. This is the zero condition of the timing store, and occurs when the subtraction circuits operates (19–22) on the scan following the detection of the PID signal. If metering is taking place, and the condition for setting relay MAA occurs during a timing cycle, one or more of the elements in blocks TY2 and TY3 will be marked with a 0, and in this case relay MAA is re-set by the circuit:

$\underline{\text{SLP}}$.(TY2+3)—$\underline{\text{MAA}}$ (10)

When relay MAA is first set by the called subscriber's answering, it remains set due to the zero condition of the timing store, and a relay MBA is set during the scan of the spare element TX6.TY3, by means of the circuit:

MAA.PID.TX6.TY3—MBA (11)

This occurs during the scan of the register in advance of the register dealing with the call which the called subscriber has just answered, because relay MAA is set during the scan of the latter register by the pre-read head.

The setting of relay MBA causes a metering pulse POM to be returned to the calling subscriber's meter via the outgoing scanning circuit by means of the circuit:

MBA—POM (12)

Thus the first meter pulse occurs immediately the called subscriber answers.

The set condition of relay MBA is now used to initiate the translation of the meter code digit stored in block TY1 of the register. The markings in elements TX3–6 of block TY1 are used to set up a code on four binary circuits or relays, MCA, MDA, MEA and MFA, by means of the four circuits:

MBA.SLS.TX3.TY1—MCA (13)

MBA.SLS.TX4.TY1—MDA (14)

MBA.SLS.TX5.TY1—MEA (15)

and

MBA.SLS.TX6.TY1—MFA (16)

Where a 1 is read from one of the digit storage elements of block TY1, the corresponding binary circuit is set, whereas if a 0 is detected, the corresponding binary circuit remains in the re-set condition. Relay MBA remains in the set condition during the scan of blocks TY2 and TY3 of the register, and it is therefore necessary to include the timing pulse TY1 in each of these four circuits to limit their operation to this scanning period.

There are 16 possible meter code digits represented by the 16 possible combinations of the set or re-set condition of relays MCA, MDA, MEA and MFA. The output circuits of these relays are connected, as shown in FIG. 10, to 16 coincidence circuits, and for each meter code digit, an output will occur on only one of the leads R0–15. These leads are taken, in accordance with the translations required, to a series of eleven OR gates, the outputs of which are connected to a similar number of coincidence circuits, to which timing pulses corresponding to the elements of the timing storage blocks are also connected. The outputs of these latter circuits connect to the circuit SBS, and where an output signal is received from an OR gate, a 1 is written into the element determined by the timing pulses applied to the corresponding coincidence circuit.

The operation of this translation circuit will be more clearly seen from an example. If a metering interval of ten seconds were required by the meter code digit 13, relays MCA, MEA and MFA would be set in accordance with the 1 markings of the binary number 13 stored in block TY1. It will be seen from FIG. 10 that an output will be obtained on lead R2. Since the number in block TY2 and TY3 is reduced by one on every scan by the common equipment, i.e. every 100 ms., a pulse interval of 10 seconds would require the timing store to be emptied in 100 scans, so that the number required as a translation of the meter code 13 would be 100. In binary form, this would appear as 0010011, the lowest order digit being on the left. In order for the outputs of the coincidence circuits to write this number in blocks TY2 and TY3, the lead R2 must be connected to the OR gates corresponding to the coincidence circuits identified by timing leads TX3.TY2, TX6.TY2, and TX1.TY3. A cancelling circuit:

MBA.(TY2+3)—SAS (17)

is provided to ensure that the remaining elements of blocks TY2 and TY3 are marked with a 0. At the end of the scan of the register, the four code relays and relay MBA are re-set by the circuit:

TX5.TY3—$\underline{\text{MBA.MCA.MDA.MEA}}$ and $\underline{\text{MFA}}$ (18)

The subtraction circuits are brought into operation by the setting of a relay MGA when the called subscriber answers. Relay MGA is set during the scan of element TX6.TY3 by the common equipment when a signal PID is being received, the circuit being:

$$\text{PID.TX6.TY3—MGA} \quad (19)$$

Three subtraction circuits are employed, which function in accordance with the well-known rule for subtracting 1 from a binary number, i.e. change all 1's to 0's and 0's to 1's, commencing with the lowest order digit, until a 1 has been changed to a 0. The circuits employed are:

$$\text{MGA.(TY2+3)—SAS} \quad (20)$$

$$\text{MGA.}\underline{\text{SLS}}\text{.(TY2+3)—SBS} \quad (21)$$

and $$\text{SLS.(TY2+3)—}\underline{\text{MGA}} \quad (22)$$

The first of these three circuits (20) attempts to write 0 in each element of blocks TY2 and TY3, while the second (21) writes a 1 when a 0 is detected. The third circuit (22) re-sets relay MGA to prevent further operation of the other two circuits when the first 1 is read, i.e. when first a 1 is changed to a 0. Relay MGA is re-set at the end of the scan of the register by the circuit:

$$\text{TX5.TY3—}\underline{\text{MGA}} \quad (23)$$

The subtraction process is continued during each subsequent scan of the register, until the number in the timing store is reduced to 0. A further subtraction then changes all the 0's in these two storage blocks to 1's, which is the initial zero condition for the store. On the next scan, relay MBA is set by the previously-mentioned circuit (11), and a further metering pulse POM is returned to the subscriber's line. The four code relays are again set by the meter code digit as previously described, and the translation is written into the timing store. The counting-down process and re-translation continue alternately until the connection is cleared.

When the call is terminated, the input circuit from the trunk relay set to the incoming scanner of the appropriate track equipment is opened, causing the meter register to be released. A relay MHA is set when a 0 is detected in element TX1.TY1 of the meter register, indicating that circuit (5) has been effective due to the opening of the input circuit. Relay MHA is set by the circuit:

$$\underline{\text{SLS}}\text{.TX1.TY1—MHA} \quad (24)$$

When relay MHA is in the set condition, the register is cleared by the circuit:

$$\text{MHA—SAS} \quad (25)$$

but this circuit is only operative if the 1 marking in the guard element TX2.TY1 has been cancelled. If a 1 is marked in this element, relay MHA is re-set by the circuit:

$$\text{SLS.TX2.TY1—}\underline{\text{MHA}} \quad (26)$$

and this prevents the remainder of the register from being cleared. However, the circuit:

$$\text{MHA—SAS} \quad (25)$$

will be effective in cancelling the guard marking in element TX2.TY1 at the same instant as relay MHA is reset, so that if the break in the input circuit continues until the next scan by the common equipment, and relay MHA is again set when a 0 is detected in the line condition element TX1.TY1, there will be no guard marking present to re-set relay MHA, and the register is cleared by circuit (25). It will be apparent that this only occurs when the input circuit is opened for at least 100 ms., and this will not occur during the reception of a code digit impulse train. The circuit is thus able to differentiate between the end of an impulse and the release of the connection. At the end of the scan of the register, relay MHA is re-set by the circuit:

$$\text{TX6.TY3—}\underline{\text{MHA}} \quad (27)$$

It will be seen from the foregoing description that translation of the meter code digit occupies the whole scanning time of a meter register. The subtraction circuits remain operative during the translation, but because the translation circuits are engaged in writing in the new set of digits in the timing store, the subtraction circuits will be ineffective during this scan. Furthermore the subtraction process is allowed to continue for one additional scan after the number stored in the timing store has been reduced to 0, so that the timing period is two scans longer than the translation implies. This is compensated by adjustment of the translation field and a further adjustment is made to compensate for the fact previously mentioned that the number in the meter digit store is one more than the number of impulses received.

The meter registers in the second embodiment may be the same as that shown in FIG. 8. It will be understood that the physical space on the drum taken up by a meter code and a translation code in a section of a library track will be the same as that taken up by a meter register. With the arrangement of the library tracks previously described this means that each meter register track must accommodate 5×15=75 registers. As previously mentioned six register tracks are provided giving a total of 450 registers. It will, however, be appreciated that, if desired, the library tracks may be arranged so that a smaller number of registers can be used. For instance, five library tracks may be used, each having three equally spaced reading heads when the total number of registers will be 270. A further arrangement, which is more flexible, would be to arrange each library section to deal with only one meter code and to repeat the meter code a number of times, each time following it with the appropriate translation code. The number of repetitions would depend on the number of registers desired for each track.

The meter code digit provided by the translator is received by the meter register via the trunk relay set to which it is allotted in the same way as was described for the previous example, and the circuits concerned with the storage of the meter code digit may be the same as those already described.

The output signal from each of the 15 reading heads associated with the library tracks is controlled by a relay of the series MG1–15. A signal is obtained from the library only when one of these relays is in the set condition. Because a translation is only required when the complete meter code digit has been registered, it is convenient to wait until an indication is received that the called subscriber has answered before a selection is made of the relays MG.

Relays MAA and MCA (FIG. 11) are set when a signal PID is received from the incomming scanning circuit, indicating that a called subscriber has answered, the circuit being:

$$\text{PID.TX6TY1—MAA and MCA} \quad (28)$$

It will be recalled that the signal PID occurs during the scan of the register in advance of the one to which the signal applies, and these two relays will therefore be in the set condition during the scan by the pre-read head of blocks TY2 and TY3 of the latter register.

A further condition for applying for a translation of a meter code digit is that meter pulse interval timing is not taking place, i.e. The meter timing block contains only 0's, in this embodiment. If this condition does not apply, relay MAA is re-set by the circuit:

$$\text{SLP.(TY2+3)—}\underline{\text{MAA}} \quad (29)$$

which is operative if the pre-read head detects a 1 in any of the storage elements of the meter timing blocks of the register in question. If relay MAA remains in the set condition throughout the scan by the pre-read head of these two storage blocks, a further relay MBA is set by the circuit:

$$\text{MAA.TY1—MBA} \qquad (30)$$

Relays MAA and MCA are then re-set by the circuit:

$$\text{TX2.TY1—}\underline{\text{MAA}}\text{ and }\underline{\text{MCA}} \qquad (31)$$

With relay MBA in the set condition, all the library gating relays MG are set by the circuit:

$$\text{MBA.TX2.TY1—MG(1–15)} \qquad (32)$$

Two sets of comparison circuits are now employed to select the library storage blocks in which the required translation is stored. These two sets of circuits compare the output signals from the register track reading head in use individually with those of all 15 library track reading heads, during the scan of the meter code digit storage blocks of the meter register. These two sets of circuits may be represented for convenience as:

$$\text{MBA.}\underline{\text{SLS}}\text{.SLL.(TX3–6).TY1—}\underline{\text{MG(1–15)}} \qquad (33)$$

and $$\text{MBA.SLS.}\underline{\text{SLL}}\text{.(TX3–6).TY1—}\underline{\text{MG(1–15)}} \qquad (34)$$

It will be seen that where the signals from a library track head and the register track head fail to coincide, the relay MG concerned will be re-set by one or other of the appropriate two circuits. The relay MG controlling the output from the library track reading head which reads a code corresponding to the meter code digit is, however, left in the set condition. This relay may conveniently be designated MG($x$). During the scan of the remaining blocks of the library section, the required translation will be available in the output circuit controlled by relay MG($x$), and this translation is written into the timing blocks of the meter register by the two circuits:

$$\text{MG}(x)\text{.SLL.(TY2+3)—SBS} \qquad (35)$$

and $$\text{MG}(x)\text{—SAS} \qquad (36)$$

The first of these two circuits writes 1's where these occur in the translation, while the second writes 0's in the remaining elements.

With relay MBA in the set condition, i.e. when the timing blocks of the meter register being scanned are empty and the called subscriber has answered, a meter pulse is returned to the calling subscriber's meter via the outgoing scanning circuit, during the scan of block TY2 of the meter register, by means of the circuit:

$$\text{MBA.TY2—POM} \qquad (37)$$

Relay MBA is re-set at the end of the scan of the register, and at this point the library gating relays are also re-set by the circuit:

$$\text{TX6.TY3—}\underline{\text{MBA}}\text{ and }\underline{\text{MG(1–15)}} \qquad (38)$$

Meter timing may be effected in a similar manner to that given in the previous example. A relay MDA is set when the called subscriber has answered, by means of the circuit:

$$\text{MCA.TY1—MDA} \qquad (39)$$

but since relay MCA was not set until the scan of element TX6.TY1 of the register in advance of the register in question, relay MDA is not set until the beginning of the scan of this latter register. On each scan of the meter register, with relay MDA in the set condition, 1 is subtracted from the number stored in the timing blocks by means of the circuits:

$$\underline{\text{MBA}}\text{.MDA.(TY2+3)—SAS} \qquad (40)$$

$$\underline{\text{MBA}}\text{.MDA.}\underline{\text{SLS}}\text{.(TY2+3)—SBS} \qquad (41)$$

and $$\underline{\text{MBA}}\text{.SLS.(TY2+3)—}\underline{\text{MDA}} \qquad (42)$$

In accordance with the previously-mentioned rule for subtracting 1 from a number in binary form, the first of these three circuits (40) attempts to write 0 in each element of the timing block, while the second (41) writes a 1 where a 0 was previously stored. The third circuit (42) terminates this reversal process when first a 1 has been changed to a 0, by re-setting relay MDA, which prevents further operation of the other two circuits. The output from the reset side of relay MBA is included in the above three coincidence circuits to avoid the counting-down continuing after the timing block has been emptied, since this would interfere with the registration of the translation digit.

When the timing store becomes empty, a meter pulse is again generated by the circuit (37). On the scan when this occurs, circuit (42) would be ineffective, because a 1 will not be written in any of the elements of the timing blocks, and an additional re-setting circuit is provided for relay MDA which is operative at the end of the register scan. This is:

$$\text{TX6.TY3—}\underline{\text{MDA}} \qquad (43)$$

Counting-down and re-translation continue alternately while the connection is maintained, a further meter pulse being generated each time the number in the timing storage blocks is reduced to zero.

When the call is terminated, the meter register is cleared by circuits corresponding to those previously described in connection with the first example.

With magnetic drums of conventional design, it may not be convenient to mount the pre-read head the small distance from the normal read head that is required by the length of track occupied by a register. A register may occupy, for example, about 0.2 inch of track, and this spacing would generally be too close for the head mounts. The difficulty may be overcome by locating the pre-read head some distance in advance of the normal read head, and introducing a time delay equivalent to the scanning time of the excess distance between the heads.

One method of doing this is by transferring the signal from the pre-read head to an additional track, and reading from the additional track at a point behind the writing point. For example, suppose the pre-read head were positioned three registers in advance of the normal reading on each of the register tracks. The output from the reading circuit common to all the pre-read heads, which is switched from track to track as these are scanned in turn, is taken to a write head on an additional track, on which a further read head is positioned, a distance of two registers behind the write head. The output from this read head is now used in place of the output from the common pre-read circuit, the signal leaving this head being one register in advance of the signal leaving the normal read head.

We claim:

1. In an arrangement for transmitting metering pulses to a calling subscriber's meter in a telephone system and comprising a magnetic drum, a plurality of groups of storage blocks on said magnetic drum, and means for registering a first number in a storage block of one of said groups of storage blocks, said first number being representative of a charge rate for a connection, the provision of means responsive to a called subscriber answering for translating said first number into a second and larger number and for registering said second number in other storage blocks of said one group of storage blocks, means effective at predetermined time intervals for changing by one the value of said second number and means responsive to said second number attaining a predetermined value for transmitting a metering pulse to the calling subscriber's meter.

2. The arrangement as claimed in claim 1 and comprising in addition means for scanning said groups of storage blocks successively at predetermined time intervals and means responsive to the scanning of a group of storage blocks for subtracting one from said second number.

3. The arrangement as claimed in claim 1 wherein each storage block of a group of storage blocks has a plurality of storage elements for storing numbers in binary code, the storage elements being identified by a series of timing pulses and wherein said translating means comprise a plurality of leads one for each value of said first number, a plurality of first gate circuits each having at least one of said leads connected as an input and a single output, and an equal plurality of second gate circuits to each of which an output from one of said first gate circuits is applied and to each of which timing pulses representative of one of the storage elements of said other storage blocks is applied whereby a signal applied to one of said plurality of leads when the corresponding first number is registered is passed through at least one of said first gate circuits to at least one of said second gate circuits and thence to the output of said second gate circuit at a time dependent on the timing pulses applied to said second gate circuit to enable said second number to be stored in said other storage blocks.

4. The arrangement as claimed in claim 1 wherein each storage block of a group of storage blocks has a plurality of storage elements for storing numbers in binary code and wherein said translating means comprise further storage blocks bearing permanent recordings of all values of said first and second numbers, means responsive when said first number is registered for comparing said registered first number simultaneously with the permanent recorded values of said first number in said further storage blocks and means responsive to coincidence being obtained between said registered first number and said permanently recorded first number for extracting the corresponding second number and registering said corresponding second number in said other storage blocks.

5. The arrangement as claimed in claim 4 wherein said further storage blocks are divided into a number of sections equal to the number of values of said first number, an individual reading head being provided for each section and the values of said first number are recorded in the sections in a different order whereby all values of said first number are available simultaneously from the different reading heads.

6. In an arrangement for transmitting metering pulses to a calling subscriber's meter in a telephone system and comprising a magnetic drum, a plurality of groups of storage blocks on said magnetic drum, and means for registering a meter code digit in a storage block of one of said groups of storage blocks, the provision of means responsive to a called subscriber answering for translating said meter code digit into a number and for registering the number in other storage blocks of said one group of storage blocks, means for scanning said groups of storage blocks successively at predetermined time intervals, means responsive to the scanning of a group of storage blocks for changing by one the value of said number and means responsive to said number attaining a predetermined value for transmitting a metering pulse to the calling subscriber's meter.

7. In an arrangement for transmitting metering pulses to a calling subscriber's meter in a telephone system and comprising a magnetic drum, a plurality of groups of storage blocks on said magnetic drum, and means for registering a meter digit in a storage block of one of said groups of storage blocks, the provision of translating means, detecting means operative in response to an answering condition on a called subscriber's line for causing a first metering pulse to be transmitted to the calling subscriber's meter and for initiating the operation of said translating means to translate said meter code digit into a number and for registering said number in other storage blocks of said one group of storage blocks, means effective when said number has been registered in said other storage blocks for restoring said detecting means and said translating means, means effective at predetermined time intervals for changing by one the value of said number, means responsive to said number attaining a predetermined value for again operating said detecting means whereby a second metering pulse is transmitted to the calling subscriber's meter and said translating means become operative in preparation for the transmission of a third metering pulse to said calling subscriber's meter.

8. The arrangement as claimed in claim 7 and comprising in addition means for scanning said groups of storage blocks successively at predetermined time intervals and means responsive to the scanning of a group of storage blocks for subtracting one from the number stored therein.

References Cited in the file of this patent

UNITED STATES PATENTS

| | | |
|---|---|---|
| 1,872,842 | Storch et al. | Aug. 23, 1932 |
| 2,723,311 | Malthaner | Nov. 8, 1955 |
| 2,723,312 | McGuigan et al. | Nov. 8, 1955 |
| 2,749,037 | Stibitz | June 3, 1956 |
| 2,805,286 | Baker | Sept. 3, 1957 |
| 2,849,535 | Baker | Aug. 26, 1958 |
| 2,850,571 | Bray | Sept. 2, 1958 |
| 2,897,279 | Flood et al. | July 28, 1959 |

FOREIGN PATENTS

| | | |
|---|---|---|
| 763,828 | Great Britain | Dec. 19, 1956 |